April 17, 1951     H. R. BIERMAN     2,549,049

DIAPHRAGM TYPE BLOOD PRESSURE GAUGE

Filed Sept. 28, 1949

INVENTOR
HOWARD R. BIERMAN

BY
ATTORNEY

Patented Apr. 17, 1951

2,549,049

UNITED STATES PATENT OFFICE 2,549,049

DIAPHRAGM TYPE BLOOD PRESSURE GAUGE

Howard R. Bierman, San Francisco, Calif.

Application September 28, 1949, Serial No. 118,294

2 Claims. (Cl. 128—2.05)

This invention relates generally to apparatus for measuring physiologic pressure phenomena, more particularly for determining pulse and arterial blood pressure.

Various devices have been heretofore proposed and used for utilizing electrical means for determining such pressures but the same have been defficient either structurally, functionally or economically. It is an object of my invention to provide an improved physiologic pressure measuring device that is relatively simple in construction, operation and maintenance, is rugged and yet combines a high degree of sensitivity and accuracy as well as being compact and easily applied.

Other objects and advantages will be more apparent to those skilled in the art from the following description of the accompanying drawings in which.

Figure 1:
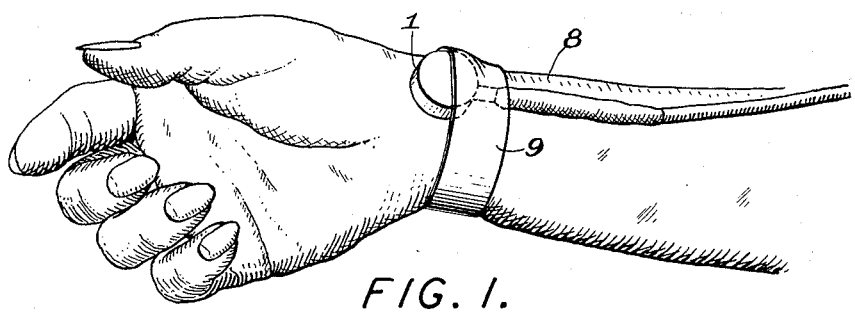
Fig. 1 is a perspective of my improved device applied to the arm of a person.
Figure 2:
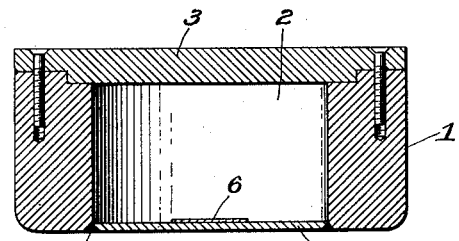
Fig. 2 is a very much enlarged cross-sectional view of the device taken substantially on the line 2—2 of Fig. 3.
Figure 3:
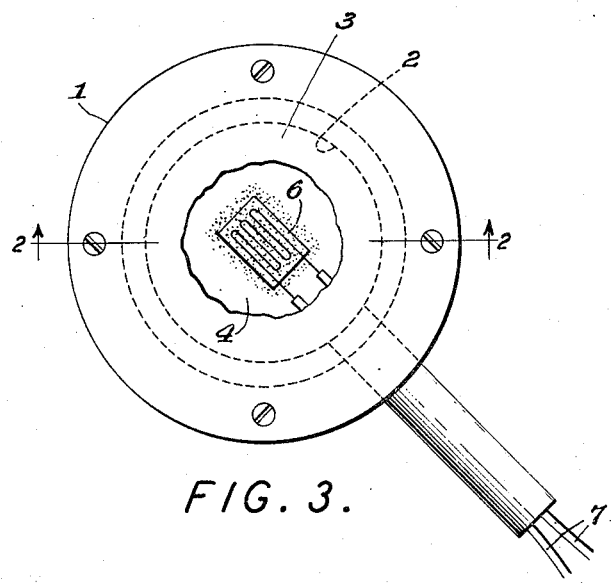
Fig. 3 is a plan view of the device partly broken away to show the electric strain gage.

In the particular embodiment of the invention shown herein a relatively rigid circular casing 1 has a chamber 2 normally filled only with air and closed at one end by an upper relatively rigid cover plate 3 and at the other end by a thin flexible diaphragm 4 suitably soldered or otherwise secured around its periphery at a seam 5 to the casing 1. An electric resistance strain gage diagrammatically indicated at 6, of the type shown in Patent 2,292,549, is bonded throughout its effective length to the inner surface of diaphragm 4. Lead wires 7 extend from the gage through a suitable opening in the casing 1 for connection to any usual and well-known oscillograph or other instrument for measuring changes in the electrical resistance of the strain gage in response to flexural strains of diaphargm 4. When the device is held against the skin in a location such as over the wrist pulse, the skin, as a result of the beat of the heart, transmits pressure to the diaphragm causing it to deflect minutely and thus strain the gage to produce a resistance change responsive to the pressure transmitted.

To understand the relatively small character of this device, it has been made with the following dimensions: the steel diaphragm 4 was 0.255 mm. thick and 15 mm. in diameter, the rear wall 3 was 2.25 mm. thick and separated from the diaphragm 4 by 8.50 mm., the overall diameter of the casing 1 having been 24 mm. The natural frequency of vibration of this diaphragm with gage attached is approximately 100 cycles per second and it exhiibts less than critical damping. It is thus seen that the device is sufficiently small that the diaphragm surface can be placed directly on the area of the patient where the pulsating organ or vessel is near to the surface, as is shown diagrammatically in Fig. 1 where the device is placed on the wrist pulse of a person's arm 8. For convenience, the measuring circuit preferably comprises a Wheatstone bridge of which gage 6 is one arm, together with a galvanometer to show changes of the resistance of gage 6 induced by the arterial pressure variations. The portion of the Wheatstone bridge circuit external of the device 1 is preferably provided with conventional means for balancing so that the deflection of a galvanometer gives a measure of the pressure applied against the diaphragm. The pressure and position of the device on the skin surface is selected by observing the deflection of a galvanometer or other deflecting element of a suitable measuring instrument, and once the optimum tracing or deflection is observed, the device is fixed in that position by an overlying strap or tape 9. In order to make use of the maximum sensitivity of the indicator, the bridge circuit is then brought to balance so that the pulsations take place about the null point of the bridge. The sensitivity of the indicator is then raised until the desired amplitude of deflection is obtained.

Because of the high frequency response of my improved combination resulting from the use of a wire resistance strain gage, freedom from hysteresis, and the intimate relationship of the wire gage to the skin through the diaphragm which is in direct contact with the gage and skin, it has been possible to obtain very effective recordings of pressure, all in a simple, direct and expeditions manner.

Recordings of the apex cardiogram can also easily be taken by placing the instrument over the skin region giving maximum pressure from the apex beat and a pneumographic record of respiration can be obtained by placing the instrument over the chest wall, preferably on the right side to avoid detection of and interference from the cardiac motion.

It will of course be understood that various changes in details of construction and arrangement of parts may be made by those skilled in the art without departing from the spirit of

I claim:

1. A physiologic pressure measuring device comprising a relatively rigid body member having a flexible diaphragm for direct contact with the skin of a patient, said body and diaphragm being of a size to allow its placement only over the area of the skin adjacent the point of pressure to be measured, and an electrical resistance wire strain gage bonded throughout its length directly to said diaphragm on the side thereof opposite the side which contacts the skin so as to be responsive to pressure transmitted by the skin against said diaphragm resulting in flexing thereof, said diaphragm and strain gage being of such rigidity that the device exhibits a natural frequency sufficiently high to enable it to respond substantially without distortion to the dynamic pulsations of physiologic pressure to be measured.

2. The combination set forth in claim 1 further characterized in that said body member comprises a relatively rigid hollow cylindrical member, and a cover for closing one end of said cylindrical member, the hollow member being closed at its other end by said diaphragm.

HOWARD R. BIERMAN.

REFERENCES CITED

The following references are of record in the file of this patent:

UNITED STATES PATENTS

| Number | Name | Date |
|---|---|---|
| 1,830,829 | Eyster | Nov. 10, 1931 |
| 2,400,467 | Ruge | May 14, 1946 |

FOREIGN PATENTS

| Number | Country | Date |
|---|---|---|
| 59,013 | Switzerland | Sept. 2, 1911 |